(12) United States Patent
Thiyagarajan et al.

(10) Patent No.: US 8,903,807 B2
(45) Date of Patent: Dec. 2, 2014

(54) VALIDATING DATABASE TABLE PARTITIONING SCHEMES USING STRATIFIED RANDOM SAMPLING

(75) Inventors: Murali Thiyagarajan, Concord, NH (US); Praveen T. J. Kumar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/551,402

(22) Filed: Jul. 17, 2012

(65) Prior Publication Data

US 2014/0025658 A1    Jan. 23, 2014

(51) Int. Cl.
*G06F 7/00*     (2006.01)
*G06F 17/30*    (2006.01)

(52) U.S. Cl.
USPC .......................................... 707/719

(58) Field of Classification Search
None
See application file for complete search history.

(56) References Cited

U.S. PATENT DOCUMENTS

2007/0174335 A1*  7/2007  Konig et al. ............... 707/104.1

OTHER PUBLICATIONS

Chaudhiri et al., Compressing SQL Workloads Jun 4-6, 2002, ACM, SIGMOD 2002, pp. 488-499.*
Deshpande et al., Independence is Good: Dependency-Based Histogram Synopses for High-Dimensional Data May 21-24, 2001, ACM SIGMOD 2001, pp. 199-210.*
Berg et al., Finding Perfect Auto-Partitions is NP-hard Mar 31, 2009, http://www.win.tue.nl/~Akhosrav/papers/auto-part-EWCG.pdf.*
Hogg et al., Applied Statistics for Engineers and Physical Sciencists 1992, Macmillan Publishing Company, $2^{nd}$ ed, p. 160.*
Gogala, RE: Partitioning opinion Aug 31, 2004, orafaq.com, http://www.orafaq.com/maillist/oracle-I/2004/08/31/2166.htm.*
Chiplunkar, MY Notes on the Migration to PostgreSQL Experience Jan. 10, 2008, https://blogs.oracle.com/chiplunkar/entry/my_notes_on_the_migration.*
Oracle Performance Tuning, Oracle Database 10g Performance Tuning Tips & Techniques 2007, McGraw-Hill, Chapter 6, The Oracle SQL Trace Utility http://techbus.safaribooksonline.com/9780072263053/preface-id1#X2ludGVybmFsX0h0bWxWaWV3P3htbGlkPTk3ODAwNzly NjMwNTMlMkZ0aGVfb3JhY2xlX3NxbF90cmFjZV91dGlsaXR5 JnF1ZXJ5PSgoJTlycGFydGl0aW9ucyUyMGFyZSUyMHRhYmx lcyUy.*
Olsen et al., "Special Focus: Sampling Distributions", AP Statistics, The College Board, pp. 1-65, 2007.
David Moore, "The Basic Practice of Statistics: Sampling Distributions," 5th Edition, Chapter 10, p. 249, Jan. 2009.
Brase, et al., "Understandable Statistics—Concepts and Methods, Introduction to Sampling Distributions," 9th Edition, Chapter 7, pp. 292-327, Jan. 2011.

* cited by examiner

*Primary Examiner* — Jason Liao
(74) *Attorney, Agent, or Firm* — Vista IP Law Group, LLP

(57) ABSTRACT

A method, system, and computer program product for validating database table partitioning from partition advisors. The method commences by receiving a workload comprising a plurality of queries, then analyzes the queries to determine stratification buckets based on the usage of tables in the queries. Further analysis of the queries results in assigning the queries into one or more of the stratification buckets from which buckets a number n of queries (n being smaller than the total number of queries in the received workload) are drawn from the stratification buckets to form a representative workload having a confidence interval C and a margin of error M. Now, having a representative workload that is smaller, yet statistically representative of the received workload, a computer evaluates each of a plurality of partition schemes using the representative workload to determine an optimal partitioning scheme. The confidence interval C can be increased or decreased.

20 Claims, 10 Drawing Sheets

VALIDATING DATABASE TABLE PARTITIONING SCHEMES USING STRATIFIED RANDOM SAMPLING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of relational database systems and more particularly to techniques for validating database table partitioning schemes using stratified random sampling.

BACKGROUND

Some embodiments of the present disclosure are directed to an improved approach for implementing validating database table partitioning schemes using stratified random sampling. For example, some commercial deployments have approached the task of validating database table partitioning schemes using specialized tools or modules, sometime referred to as "partition advisers".

Earlier attempts at database table partitioning relied on exhaustively enumerating candidate partitioning schemes, and then evaluating possible candidate partition schemes using a query workload. A candidate partition was evaluated with respect to a different partition scheme based on the cost (e.g., empirical runtime cost or estimated runtime cost) of running a complete workload on the candidate partitioning schemes, and then comparing the costs to find the lowest cost partition for the given workload. Thus, identifying an optimal partitioning scheme can often become very time- and resource-consuming as the number of candidate partition schemes grows, and as the number of queries in the workload grows. In modern practice, the overall resource costs to find an optimal solution has become prohibitively high.

What is needed is a way for evaluating partitioning schemes to dramatically improve performance while concurrently:

Improving manageability.
Improving availability.
Performing partitioning in a manner that is transparent to the applications.

By validating candidate partition schemes against much smaller—and yet statistically representative—set of samples from the workload (e.g., using stratified random sampling), it is possible to significantly reduce the resource-intensity of evaluating partitioning schemes in order to make a partitioning scheme recommendation—and yet without compromising the quality of the recommendation. As aforementioned, legacy technologies, especially those technologies involving exhaustive enumeration for evaluation under large workloads, becomes impractical as the enumeration grows. Reliance on such technologies involving exhaustive enumeration can lead to incorrect partitioning recommendations. An improved approach is needed.

SUMMARY

The present disclosure provides an improved method, system, and computer program product suited to address the aforementioned issues with legacy approaches. More specifically, the present disclosure provides a detailed description of techniques used in methods, systems, and computer program products for validating database table partitioning schemes using stratified random sampling.

Disclosed herein are a method, system, and computer program product for validating database table partitioning used in relational database systems. The method commences by receiving a workload comprising a plurality of queries, then analyzes the queries to determine stratification buckets based on the usage of tables in the queries. Further analysis of the queries results in assigning the queries into one or more of the stratification buckets from which buckets a number n of queries (n being smaller than the total number of queries in the received workload) are drawn from the stratification buckets to form a representative workload having a confidence interval C and a margin of error M. Now, having a representative workload that is smaller, yet statistically representative of the received workload, a computer evaluates each of a plurality of partition schemes using the much smaller (but yet representative to a known statistical measure) representative workload to determine an optimal partitioning scheme. The confidence interval C can be varied, and the margin of error M can be varied under user control or under computer control.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Figure 1A:
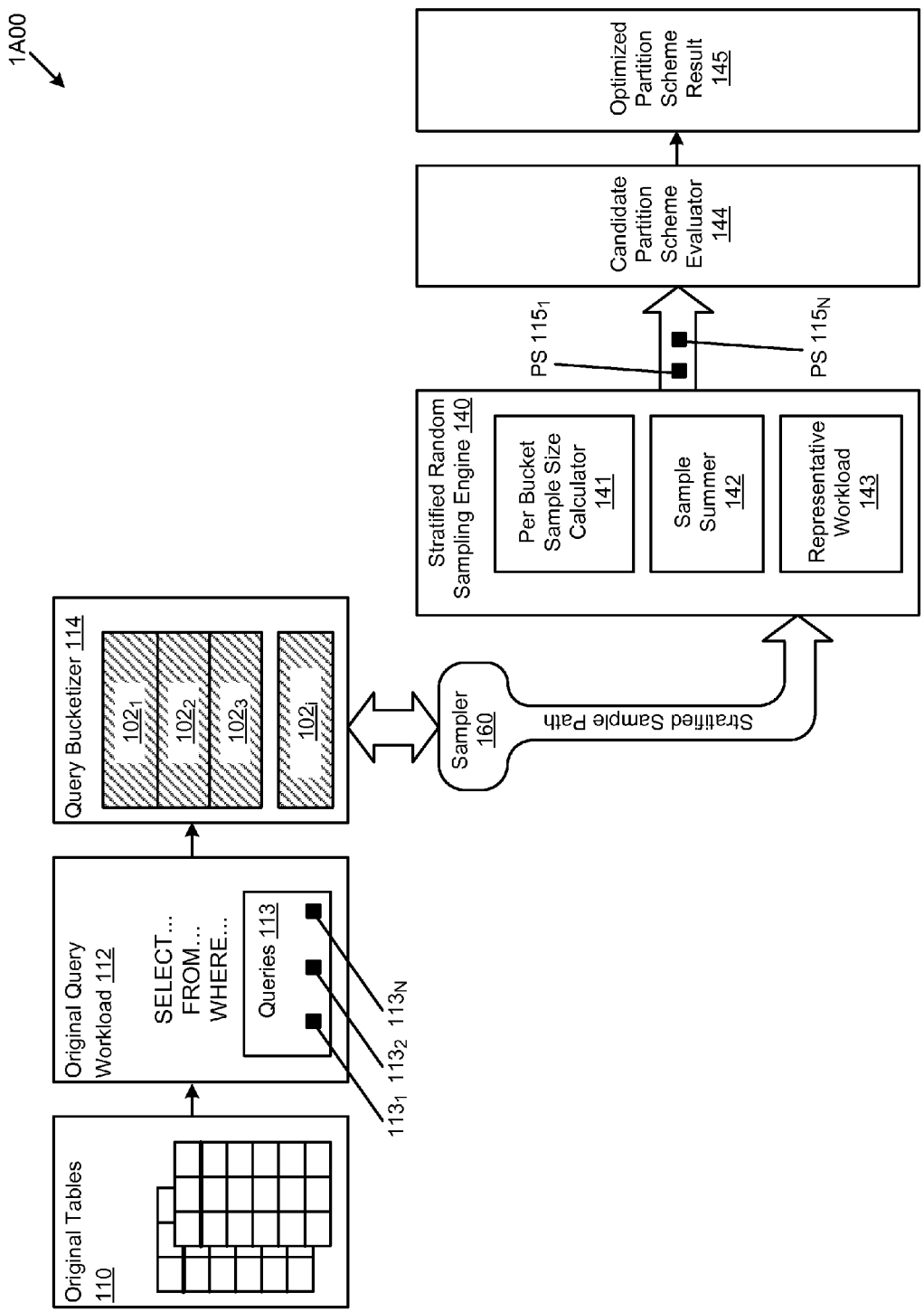
FIG. 1A is a block diagram of a system for validating database table partitioning schemes using stratified random sampling, according to some embodiments.

Some embodiments of the present disclosure are directed to an improved approach for implementing validating database table partitioning schemes using stratified random sampling for a partition advisor. More particularly, disclosed herein are environments, methods, and systems for implementing validating database table partitioning schemes using stratified random sampling for a partition advisor.

Overview

Partitioning tables within a dataset (e.g., in a relational database setting) can be bewildering even for an expert. Accordingly, disclosed herein are computer-aided techniques for evaluating possible partitioning schemes. Many tradeoffs exist, and many factors such as table sizes, which columns to index, nature of the given query workload, and platform (e.g., CPU resources and memory demands) need to be considered.

In one computer-aided approach, a computer program generates candidate partition schemes and measures the cost of each partition scheme, and the costs are compared against each other to identify one or more "winning" partition schemes. In some cases all partition schemes are evaluated before the computer program makes a recommendation. In another case, a "best so far" partition scheme is recommended after every candidate partition scheme is validated against the entire query workload. Running every query in the entire query workload against a particular partition scheme is often resource intensive, and in some cases (e.g., involving a large number of tables), running every query in the entire query workload against a particular partition scheme is often prohibitively expensive.

Another approach implements a stratified random sampling scheme to validate the candidate partition schemes. That is, candidate partition schemes are validated using a selected set of queries from the given workload. Using the techniques disclosed herein it is possible to greatly reduce to resource demand for evaluating all candidate partition schemes, while still ensuring an optimal recommendation within a range of statistical confidence. One technique involves producing a sample of queries from the workload that is representative of the given workload in its entirety; yet, the sample size is much smaller as compared to the entire workload.

In one embodiment, a quantitative goal is to minimize the overall query cost with partitioning. In such a case, it is possible to use choose a sample size, n, such that:

$$n \geq \left(\frac{z\sigma}{M}\right)^2 \quad \text{(EQ. 1)}$$

where:
z is the z-score based on a confidence interval C,
σ is the standard deviation of the optimizer query cost for the entire workload, and
M is a selected margin of error.

As a sample evaluation of EQ. 1, consider a workload of 10,000 queries with a workload average query cost μ=1000, a workload standard deviation of query cost σ=80, a confidence interval of 95% (z=1.96), and a margin of error M=10, the minimum required sample size is:

$$n \geq \left(\frac{z\sigma}{M}\right)^2 = \left(\frac{1.96 \times 80}{10}\right)^2 \approx 246. \quad \text{(EQ. 2)}$$

The z in EQ. 2 is the z-score based on a confidence interval C, and can be computed using z=(x−μ)/σ z for a given parameter value x. In some situations, a confidence interval is selected so as to define an interval over a range of values that is likely to include the value of the parameter of interest (e.g., parameter value x being an average optimizer cost value). In certain practices, z-scores are found for a given confidence interval via a lookup from a z-score table.

Thus, reaching a recommendation proceeds by validating the candidate partition schemes against just 246 queries instead of 10,000 queries. The resource intensity of evaluating just 246 queries (which is less than 2.5% of the entire workload) is much lower than resource intensity of evaluating the entire workload.

Of course, the selected sample is intended to be representative of the workload in its entirety. Certain of the herein-disclosed embodiments use a "stratified random sampling" technique in order to draw queries from the workload such that they contain the same group of tables as in the original workload, and in the same proportions as in the original workload. This ensures that the sample is a true representation of the entire workload.

Descriptions of Exemplary Embodiments

FIG. 1A is a block diagram of a system 1A00 for validating database table partitioning schemes using stratified random sampling. As an option, the present system 1A00 may be implemented in the context of the architecture and functionality of the embodiments described herein. Also, the system 1A00 or any aspect therein may be implemented in any desired environment.

As shown, the system 1A00 comprises a set of tables (e.g., original tables 110) and a workload (e.g., original query workload 112). The task at hand is to recommend a table partitioning scheme (PS). As from the previous discussion, an exhaustive enumeration of possible partitioning schemes followed by evaluation of each partitioning scheme using the workload in its entirety is resource-intensive. Accordingly, a stratified random sampling technique is implemented using a sampler 160. The sampler selects a representative set of queries from each of the buckets 102 so as to produce a smaller set of queries than the workload in its entirety, yet still representative of the table usage of the workload in its entirety—at least to a statistical confidence.

The determination of table usage is garnered from the characteristics of the aforementioned buckets. Each bucket is representative of a particular combination of tables. In certain embodiments herein, a query bucketizer 114 serves to exhaustively enumerate stratification buckets such that every possibility of combinations of tables is represented by at least one stratification bucket. And in such embodiments, the initial stratification for random sampling is defined by the exhaustively enumerated stratification buckets.

In some embodiments, the buckets (e.g., stratification bucket $102_1$, stratification bucket $102_2$, stratification bucket $102_3$, stratification bucket $102_i$, etc.), are determined based on the characteristic of the queries in the workload. For example, a workload can be stratified into buckets based on selection predicates on the tables. As shown, an original query workload 112 comprises a plurality of queries 113 (e.g., query $113_1$, query $113_2$, query $113_N$, etc.), where each query in turn comprises one or more "SELECT" clauses, and/or "FROM" clauses, and/or "WHERE" clauses. The resultant table groupings are used as the stratification criterion. The enumeration of buckets might include all possible combinations of tables. However, it is possible that even though a workload might include queries with accesses to three tables, say "A", "B", and "C", it is possible that there are queries that joins between "A and B", but never between "A and B and also C". Thus, a stratification criteria "A and B and also C" can be collapsed.

Accordingly, a stratified random sampling engine 140 serves to retrieve samples from the buckets using the sampler 160. The sampler 160 serves to randomize the samples selected from each bucket. For example, if a bucket has (for example) nine queries in that bucket, and the per bucket sample size calculator 141 determines that two samples are to be taken randomly from that bucket, then the stratified random sampling engine would be called-on two times to pick up two random samples from that bucket. The randomization of which two of the nine samples to select can be accomplished by any known randomization techniques.

Performing the bucket-by-bucket sampling as described above results in a group of queries, which are stored or summed using a sample summer 142, until all candidate buckets have been sampled, at which point the resulting group of queries is deemed the representative workload 143, and can be formatted as may be required by downstream operations.

Performing the bucket-by-bucket sampling, and summing the results of the bucket-by-bucket stratified random sampling, results in sufficient samples being drawn from the buckets to be representative of the same grouping of tables (and in the same proportion) as in the original workload. That is, the collection of samples so drawn results in a sample that contains queries accessing the same group of tables (and in the same proportion) as in the original workload, and that collection of samples becomes the representative workload.

As discussed above, the representative workload is likely to contain similar joins and selection predicates as in the original workload, and the specific likelihood is a matter of statistical confidence. For a higher confidence, the z-factor can be recalculated, and the number of samples would increase accordingly (see EQ. 1).

Now, given a representative workload with n queries, where n is fewer that the number of queries in the original query workload 112, then the shown candidate partition scheme evaluator 144 can receive partition schemes (e.g., partition scheme $115_1$, partition scheme $115_N$, etc.), and can evaluate each candidate partition scheme and compare the costs, thus resulting in an optimized partition scheme result 145.

Figure 1B:
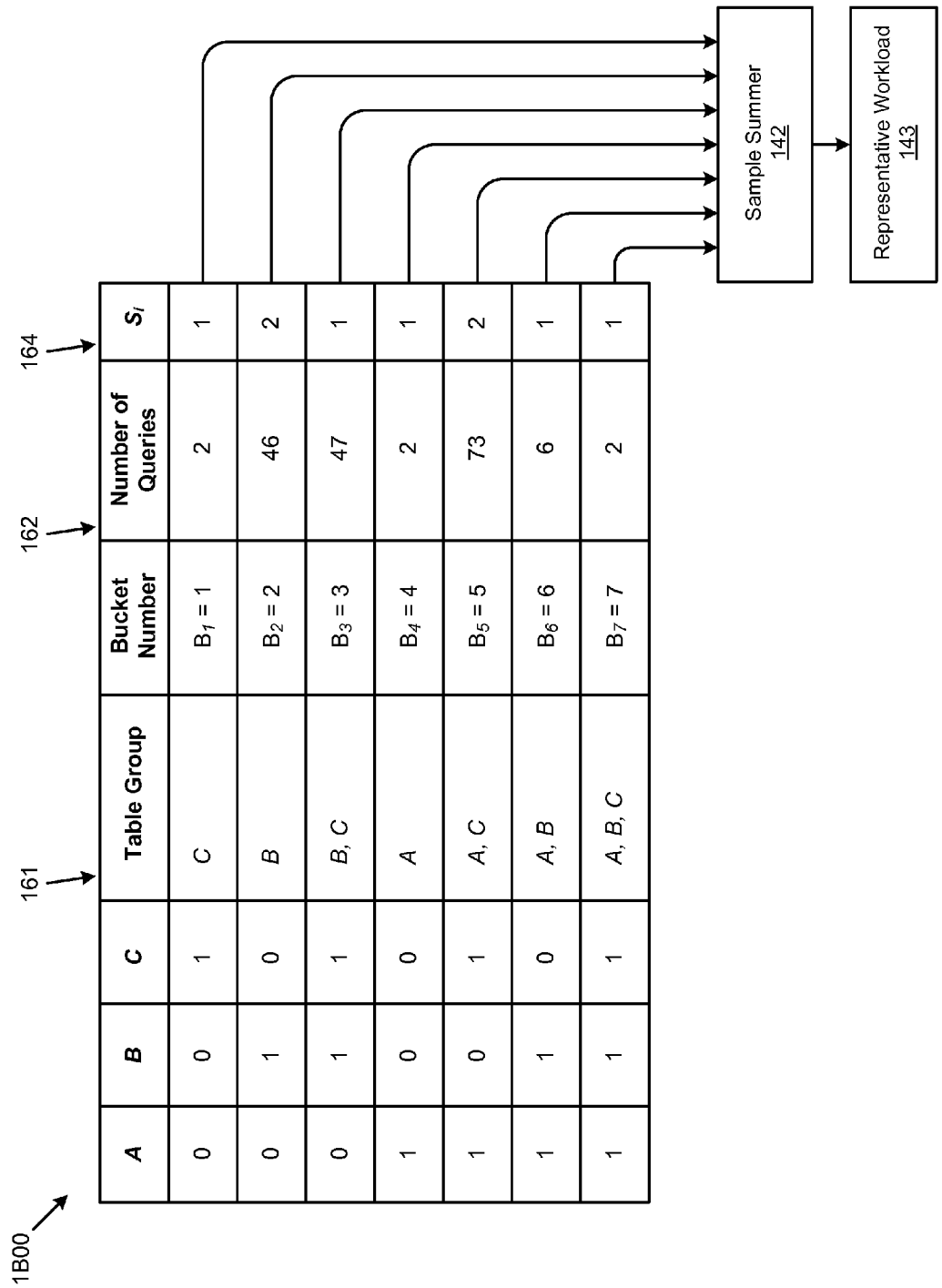
FIG. 1B depicts a technique for determining a representative workload used in a system for validating database table partitioning schemes using stratified random sampling, according to some embodiments.

FIG. 1B depicts a technique 1B00 for determining a representative workload used in a system for validating database table partitioning schemes using stratified random sampling. As an option, the present technique 1B00 may be implemented in the context of the architecture and functionality of the embodiments described herein. Also, the technique 1B00 or any aspect therein may be implemented in any desired environment.

If workload has n distinct tables, queries that access those n distinct tables are distributed among at most $2^n-1$ buckets based on the tables in their FROM clause. For example, if workload has three distinct tables A, B, and C, the entries in the table group column 161 will be as enumerated. Correspondingly, each table group can be labeled or indexed with a bucket number (e.g., bucket $B_1$ is labeled as #1 bucket) that can be used in accessing the bucket. The number of queries from the original query workload that falls into each table group is shown as the number of queries in column 162.

Now, for drawing a representative number of samples (e.g., number of samples $S_i$ 164) from each bucket, Equation 3 can be used:

$$s_i = \left(\frac{n_i}{N}\right)S \qquad \text{(EQ. 3)}$$

where:
S is the total number of samples to draw from the entire workload (see EQ 2),
$n_i$ is the number of queries in the $i^{th}$ bucket, and
N is the number of queries in the original workload.

Thus, if the $i^{th}$ bucket contains $n_i$ queries, and a workload has N queries, then $s_i$ queries are randomly drawn from the $i^{th}$ bucket, and repeated for all i of the buckets. And the union of all such samples from each bucket forms the final sample set (e.g., representative workload 143) that will be used for partition scheme validation. In this manner it is possible to identify a representative workload 143 that comprises a smaller number of samples than the original query workload but nevertheless yields extremely high quality recommendations—at least insofar as indicated by the selection of a confidence interval value (see EQ. 2).

Figure 2A:
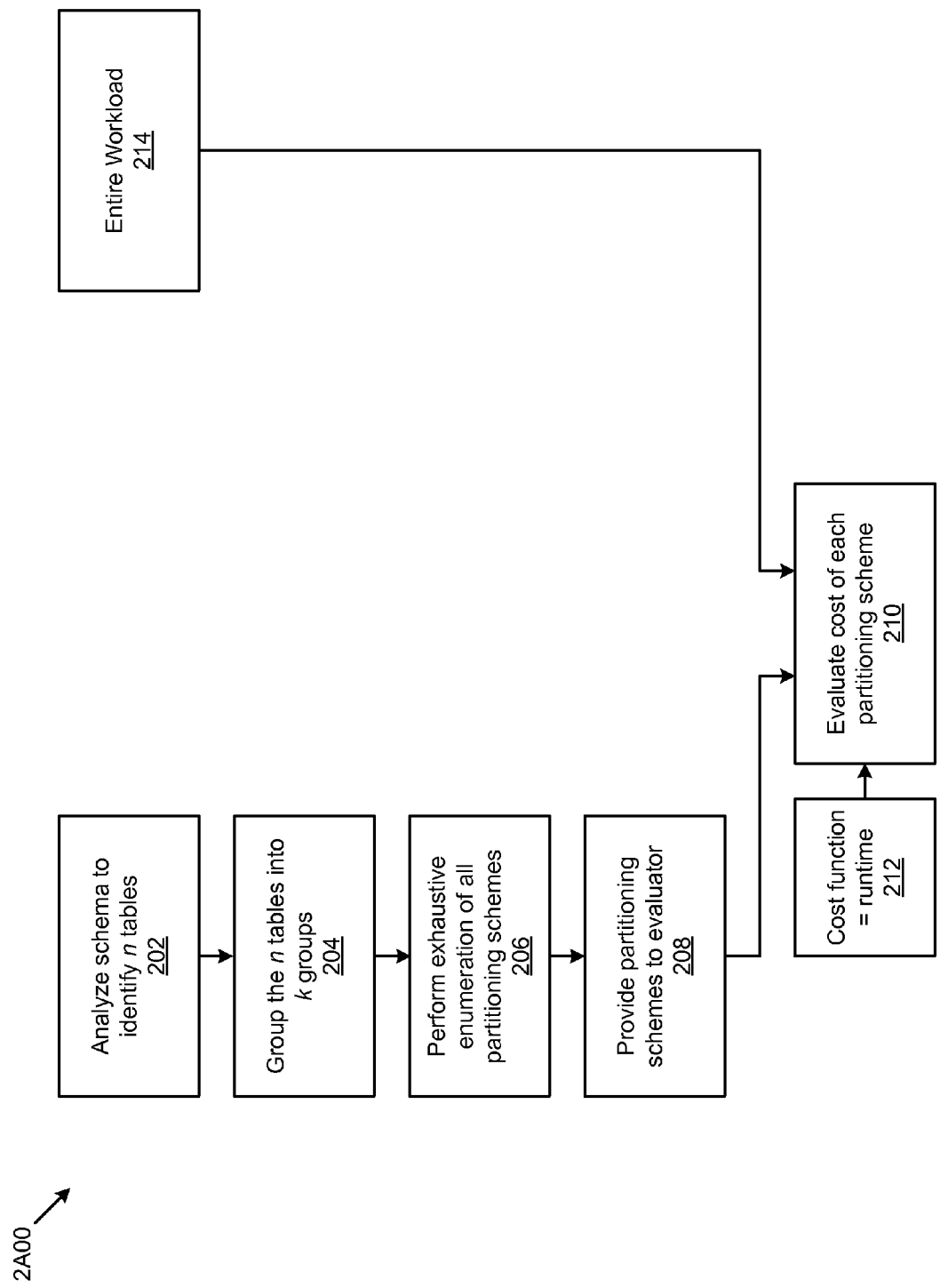
FIG. 2A depicts a technique for exhaustively validating database table partitioning schemes, according to some embodiments.

FIG. 2A depicts a technique 2A00 for exhaustively validating database table partitioning schemes. As an option, the present technique 2A00 may be implemented in the context of the architecture and functionality of the embodiments described herein. Also, the technique 2A00 or any aspect therein may be implemented in any desired environment.

Figure 2B:
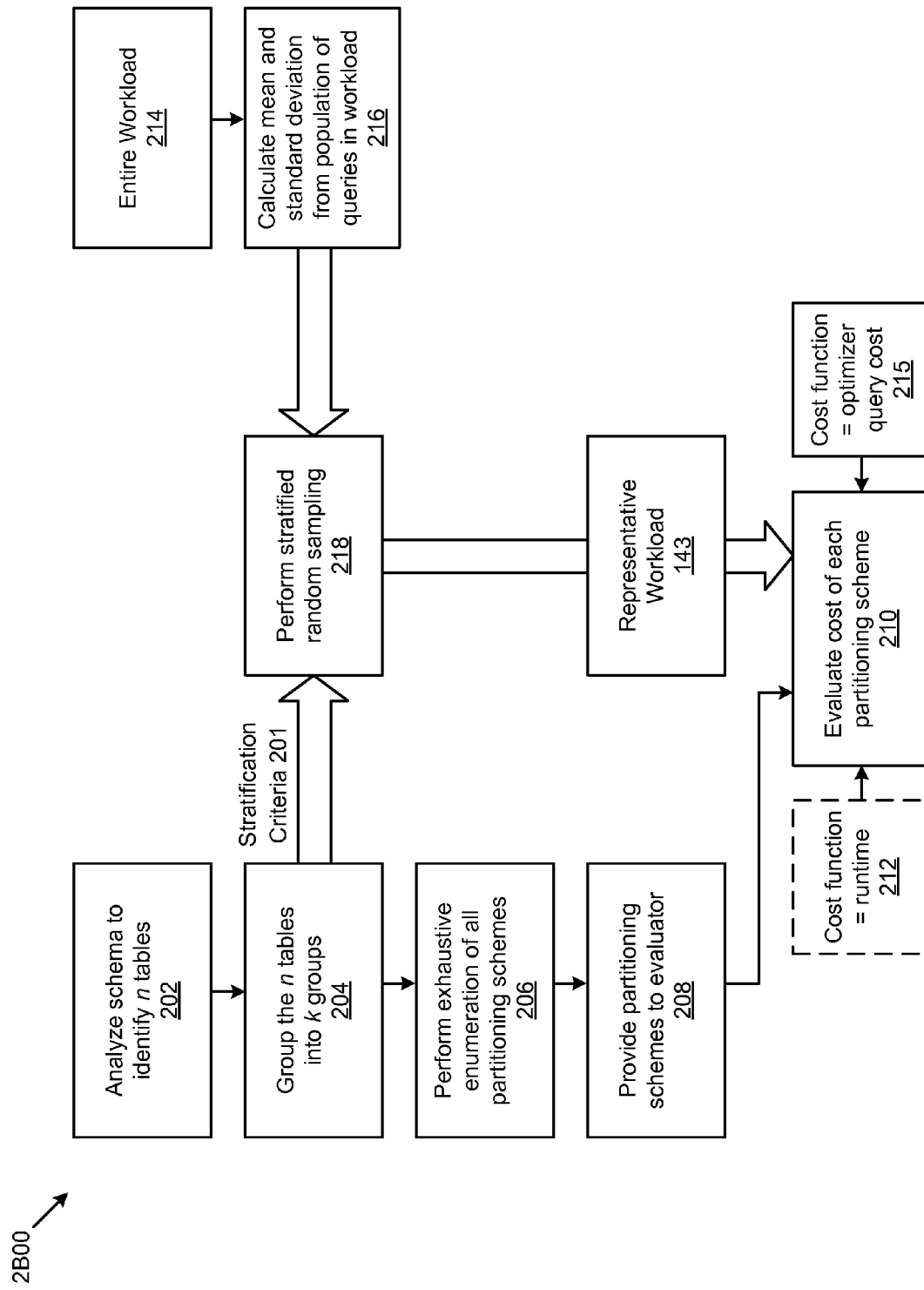
FIG. 2B depicts a technique for determining a representative workload used in a system for validating database table partitioning schemes using stratified random sampling, according to some embodiments.

The technique 2A00 includes some steps that are used in partitioning schemes using stratified random sampling (see FIG. 2B). However the steps as shown validate every partition scheme against the entire query workload. So long as the technique 2A00 is allowed to process the entire workload on each and every partitioning scheme, one or more optimal partitioning schemes can be identified. The stratified techniques are exemplified below in the discussion of FIG. 2B. Still some of the steps of FIG. 2A are also used in the techniques of FIG. 2B; such steps are discussed briefly infra.

The technique 2A00 commences to analyze a schema and/or a workload comprised of queries (see block 202) and from that analysis and identification, table groups (e.g., table groups 161) are formed (see block 204). The table groups are used to enumerate a set of partitioning schemes is formed (see block 206), which set of partitioning schemes are provided to an evaluator (see block 208). The evaluator (see block 210), in turn receives a partitioning scheme and also receives the entire workload (see entire workload 214), and executes the entire workload on each given partitioning scheme. The lowest cost or "best so far" partitioning scheme as determined using the cost function (see block 212) is tallied as the evaluations progress. Thus, the "best so far" partitioning scheme can be reported at any point in time. However there is no guarantee that the "best so far" partitioning scheme will remain the best as remaining partitioning schemes are evaluated. In fact it often happens that intermediate recommendations often differ substantially from final recommendations. Moreover, the computing resources required and elapsed time required to exhaustively evaluate the partition schemes using the entire workload can introduce significant costs and latency into a project. Consider that for k groups of n tables with p partitioning schemes, and an average query validation cost of q, the cost C of a workload size of w is:

$$C = \sum_{i=1}^{k} p^n \cdot wq \quad \text{(EQ. 4)}$$

Example

For a five partitioning schemes per table, three tables per group, seven table groups, and a 10,000 query workload is:

$$C = \sum_{i=1}^{k} p^n \cdot wq = 7 \times 125 \times 10,000q = 8.75 \times 10^6 q \quad \text{(EQ. 5)}$$

Evaluating EQ. 5 results in a prediction of 8.75 million iterations, and yet this large number of iterations is predicted even after restricting the number of partition schemes per table, and clustering the tables into smaller groups. Stratified random sample techniques can be used to significantly reduce the number of iterations, which techniques are further discussed presently.

FIG. 2B depicts a technique 2B00 for determining a representative workload used in a system for validating database table partitioning schemes using stratified random sampling. As an option, the present technique 2B00 may be implemented in the context of the architecture and functionality of the embodiments described herein. Also, the technique 2B00 or any aspect therein may be implemented in any desired environment.

The technique of FIG. 2B includes some of the operations introduced in the discussion of FIG. 2A. However, technique 2B00 applies stratified random sampling (see block 218). More specifically, after grouping the n tables into k groups (see block 204), those groups become the strata used in the stratified random sampling (see block 218). And, instead of evaluating the cost of each partitioning scheme (see block 210) over the entire workload 214, evaluation of the cost of each partitioning scheme (again, see block 210) is performed only on the results of the stratified random sampling, namely the representative workload 143. In some embodiments the cost function can be runtime (see block 212) or, in some embodiments the cost function can be an optimizer query cost (see block 215).

Also shown in FIG. 2B is an operation to calculate the mean and standard deviation of the population of queries in the entire workload (see block 216).

Using known techniques, the large sample confidence interval for a population mean is given by:

$$\mu = \bar{x} \pm z \left( \frac{\sigma}{\sqrt{n}} \right) \quad \text{(EQ. 6)}$$

where the margin of error is, $$M = z \left( \frac{\sigma}{\sqrt{n}} \right) \quad \text{(EQ. 7)}$$

and where:
μ is the average optimizer cost over the entire workload,
$\bar{x}$ is the average query cost for the sample,
σ is the standard deviation of the optimizer cost for the entire workload, and
z-score is the quantity that tells how far away the individual values can be from the sample mean.

Thus, if maximum allowable margin of error≤M, the sample size n is given by:

$$n \geq \left( \frac{z\sigma}{M} \right)^2 \quad \text{(EQ. 1)}$$

As earlier mentioned, given a workload of 10,000 queries, where the average query cost for the workload μ≈1000, and where the standard deviation for the workload σ≈80, then using a confidence interval of 95% (z=1:96) and a margin of error M=10, the minimum required sample size is:

$$n \geq \left( \frac{z\sigma}{M} \right)^2 = \left( \frac{1.96 \times 80}{10} \right)^2 \approx 246. \quad \text{(EQ. 2)}$$

The statistical accuracy of using such a small sample size is due to the Central Limit Theorem. More specifically, the Central Limit Theorem supports the contention that the sample mean and sample standard deviation of the optimizer satisfies a normal distribution, provided the original query workload is reasonably large. Some embodiments apply a very strict "99% confidence interval" and a "10% margin of error". This guarantees that the sample will have an average optimizer cost in the range of 0.9μ≤$\bar{x}$≤1.1μ, 99% of the time.

Figure 3A:
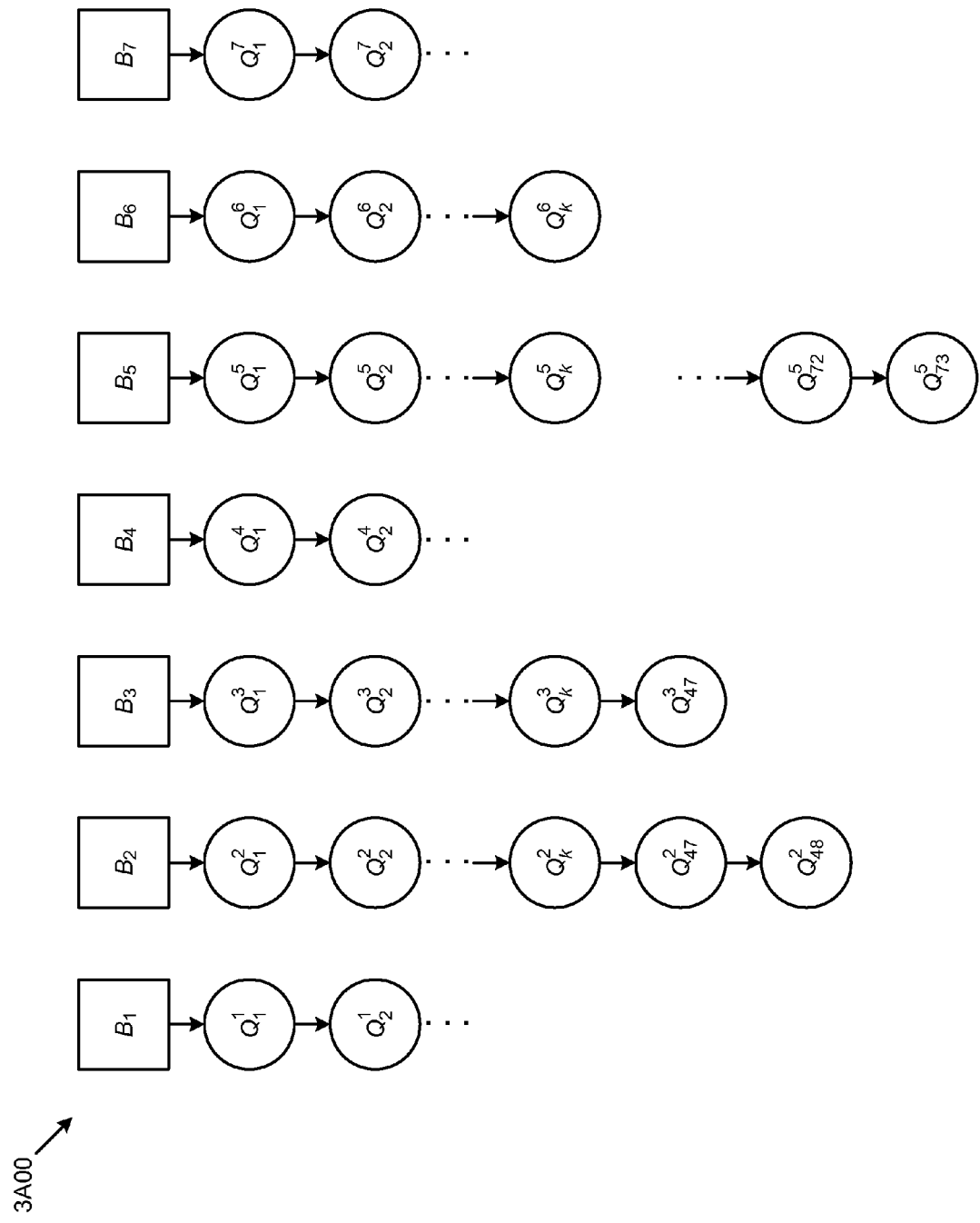
FIG. 3A depicts a distribution of queries corresponding to a stratification criteria used in a system for validating database table partitioning schemes using stratified random sampling, according to some embodiments.
Figure 3B:
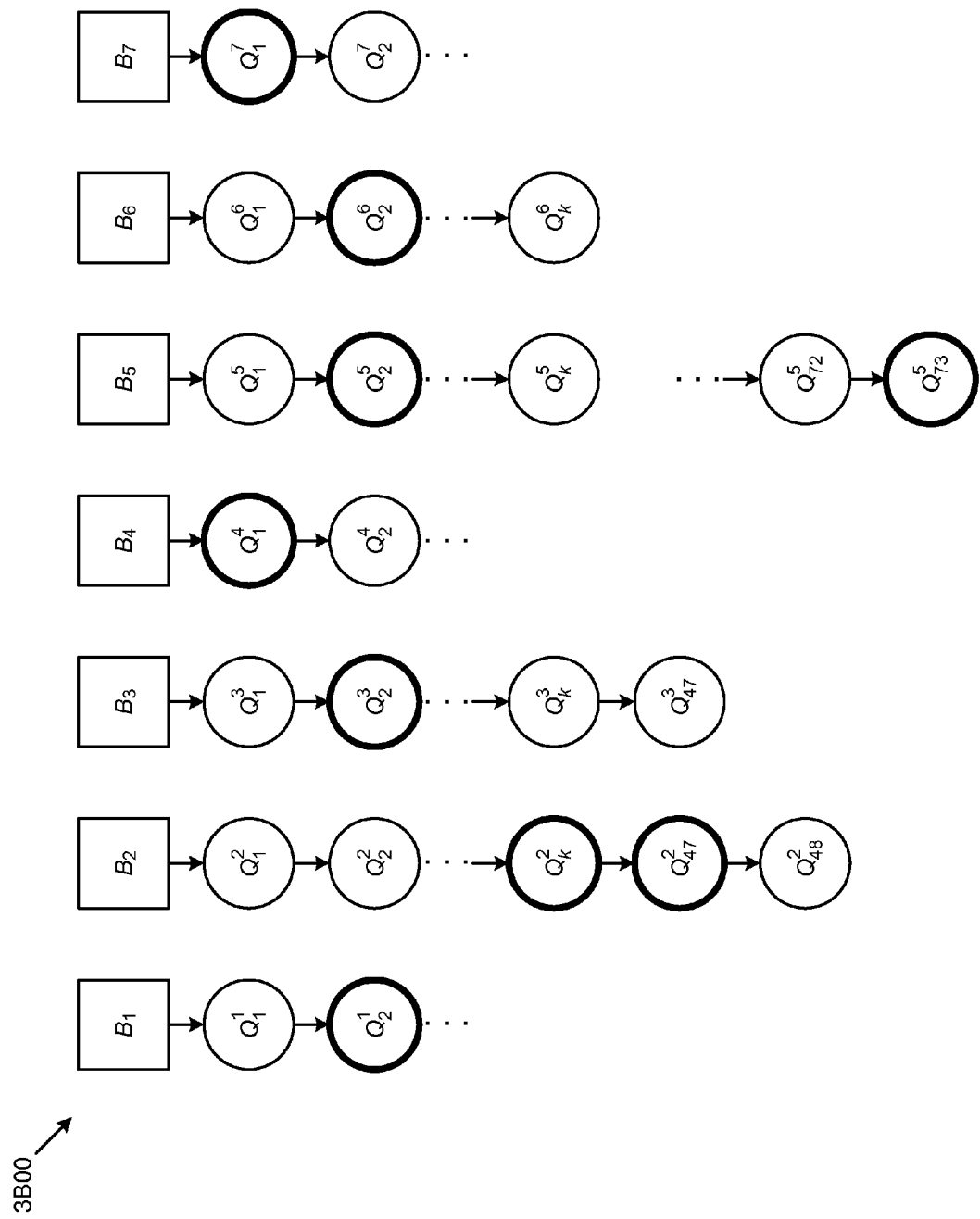
FIG. 3B depicts a random sampling of queries corresponding to stratification criteria used in a system for validating database table partitioning schemes using stratified random sampling, according to some embodiments.

FIG. 3A depicts a distribution 3A00 of queries corresponding to a stratification criteria 201 used in a system for validating database table partitioning schemes using stratified random sampling. FIG. 3B depicts a random sampling 3B00 of queries corresponding to stratification criteria 201 used in a system for validating database table partitioning schemes using stratified random sampling.

Comparing FIG. 3A to FIG. 3B it can be seen that even though some buckets (e.g., bucket $B_5$) have a large number of queries that fall into that bucket, only a modest number of queries are sampled from that bucket (depicted by a heavy line around a sampled query).

Figure 4A:
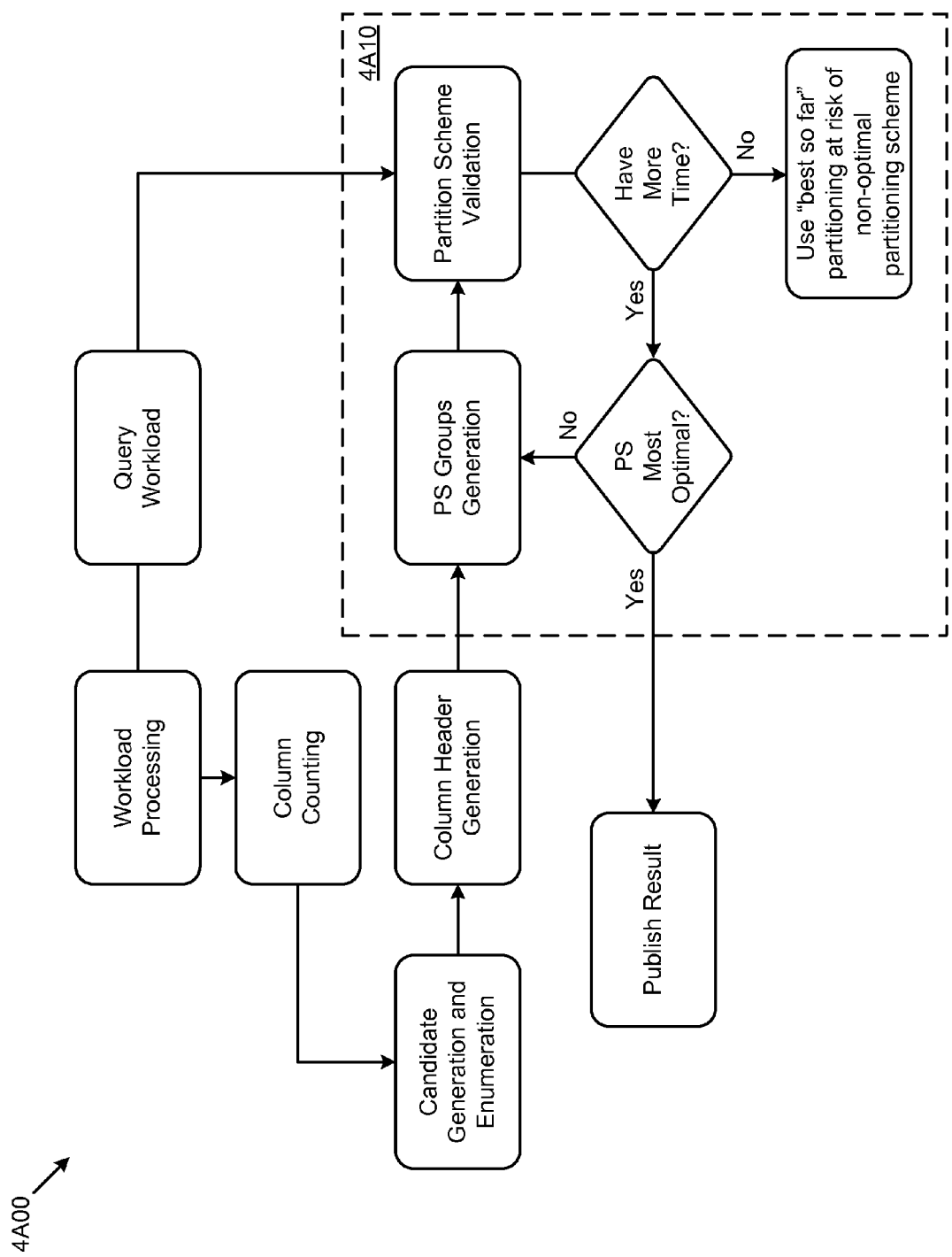
FIG. 4A depicts an explore-exploit partition evaluation approach used in a system for validating database table partitioning schemes, according to some embodiments.

FIG. 4A depicts an explore-exploit partition evaluation approach 4A00 used in a system for validating database table partitioning schemes. As an option, the present approach 4A00 may be implemented in the context of the architecture and functionality of the embodiments described herein. Also, the approach 4A00 or any aspect therein may be implemented in any desired environment.

As shown, the explore-exploit partition evaluation approach 4A00 includes variants of workload processing and partition scheme evaluation as heretofore described. Also shown is the explore-exploit tradeoff loop 4A10. In some cases an operator monitors progress of the exploration (e.g., evaluation of each partition scheme using the entire workload) and determines if the thus far published result is sufficient vis-à-vis the amount of time spent in the exploration, and so, continues in the explore-exploit tradeoff loop 4A10. Else, the "best so far" result is used.

Figure 4B:
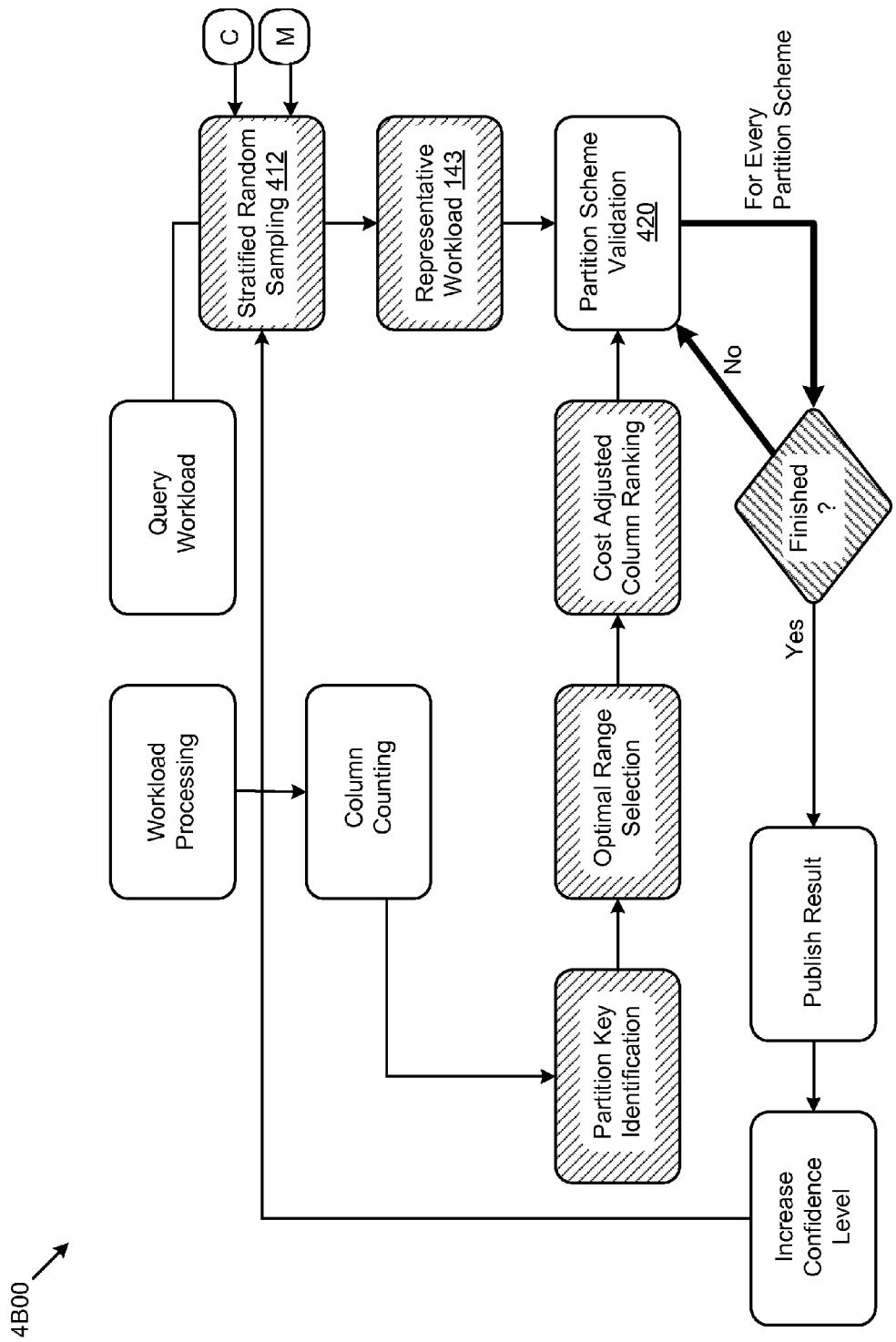
FIG. 4B depicts a confidence-based partition evaluation approach used in a system for validating database table partitioning schemes using stratified random sampling, according to some embodiments.

FIG. 4B depicts a confidence-based partition evaluation approach 4B00 used in a system for validating database table partitioning schemes using stratified random sampling. As an option, the present approach 4B00 may be implemented in the context of the architecture and functionality of the embodiments described herein. Also, the approach 4B00 or any aspect therein may be implemented in any desired environment.

The embodiment shown uses a stratified random sampling (see block 412) to form a representative workload 143 based on table groupings that minimizes average sample optimizer cost. The entire set of partition schemes are evaluated against the representative workload. In this embodiment, the representative workload is much smaller than the original query workload, all partitioning schemes are evaluated until finished, and the optimized result is published in the form of a selected partition scheme. In some embodiments, the confidence interval is increased and the approach 4B00 is again performed to result in a second (more optimized) result in the form of a selected partition scheme.

In certain embodiments, the approach 4B00 can be applied to implement a method for validating database table partitioning schemes (see block 420) using stratified random sampling. Applying this approach as shown, a method commences by receiving an original workload comprising a plurality of queries and then, after enumerating stratification buckets based on the plurality of queries, assigning the plurality of queries into one or more of the stratification buckets. A stratified random sampling operation (see block 412) serves for sampling a number n of queries drawn from at least some of the stratification buckets to form a representative workload having a confidence interval C and a margin of error M. Any one or more partition scheme validation operations (see block 420) can serve for evaluating each of a plurality of partition schemes using the representative workload to determine an optimal partition scheme. Evaluation can proceed in a serial fashion (e.g., one evaluation at a time), or in parallel (e.g., multiple evaluations at any given time).

Additional Embodiments of the Disclosure

Figure 5:
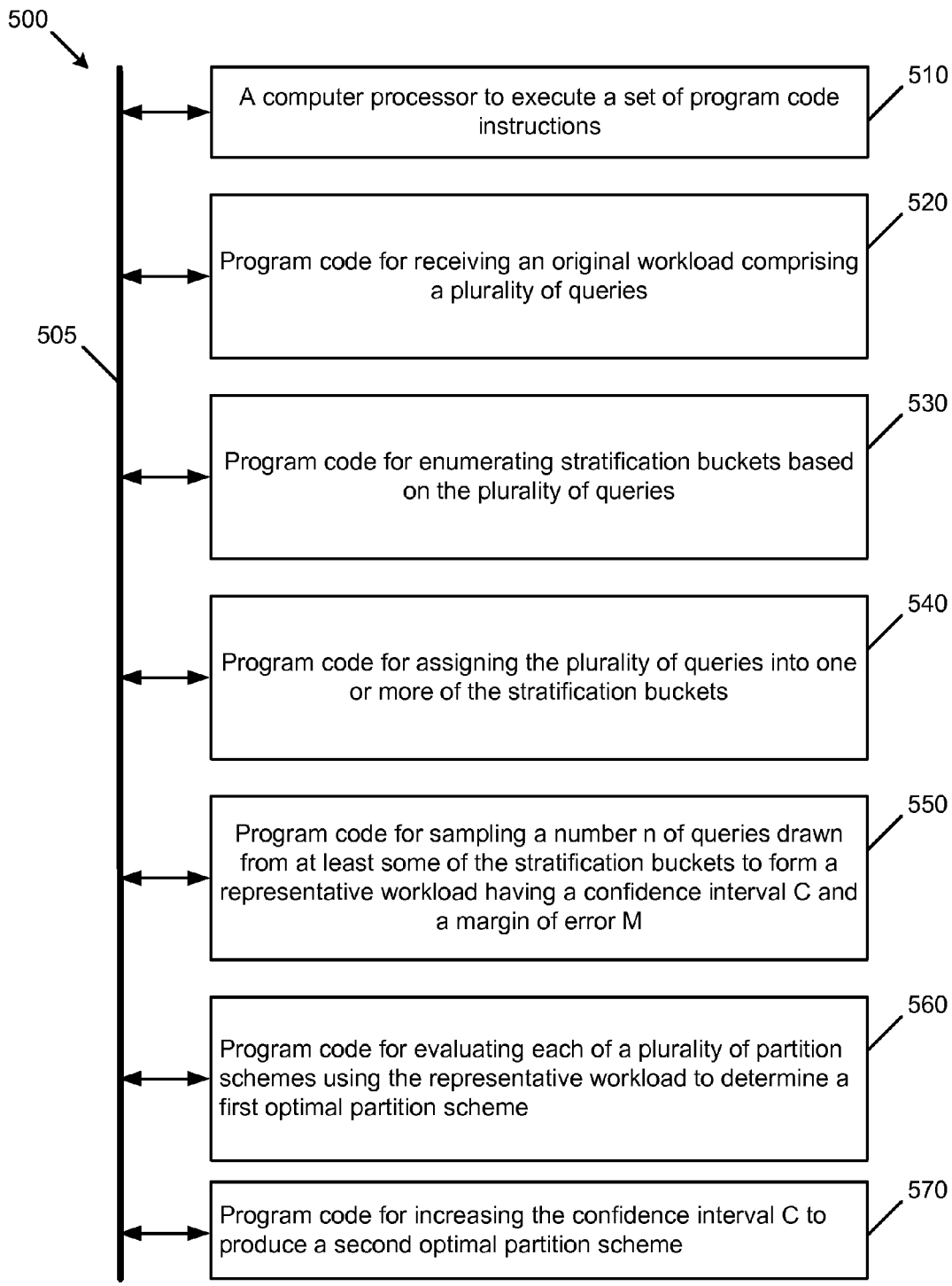
FIG. 5 depicts a block diagram of a system to perform certain functions of a computer system.

FIG. 5 depicts a block diagram of a system to perform certain functions of a computer system. As an option, the present system 500 may be implemented in the context of the architecture and functionality of the embodiments described herein. Of course, however, the system 500 or any operation therein may be carried out in any desired environment. As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The embodiment of FIG. 5 implements a portion of a computer system, shown as system 500, comprising a computer processor to execute a set of program code instructions (see module 510) and modules for accessing memory to hold program code instructions to perform: receiving an original workload comprising a plurality of queries (see module 520); enumerating stratification buckets based on the plurality of queries (see module 530); assigning the plurality of queries into one or more of the stratification buckets (see module 540); sampling a number n of queries drawn from at least some of the stratification buckets to form a representative workload having a confidence interval C and a margin of error M (see module 550); and evaluating each of a plurality of partition schemes using the representative workload to determine a first optimal partition scheme (see module 560). Some embodiments also perform operations for increasing the confidence interval C to produce a second optimal partition scheme (see module 570).

System Architecture Overview

Figure 6:
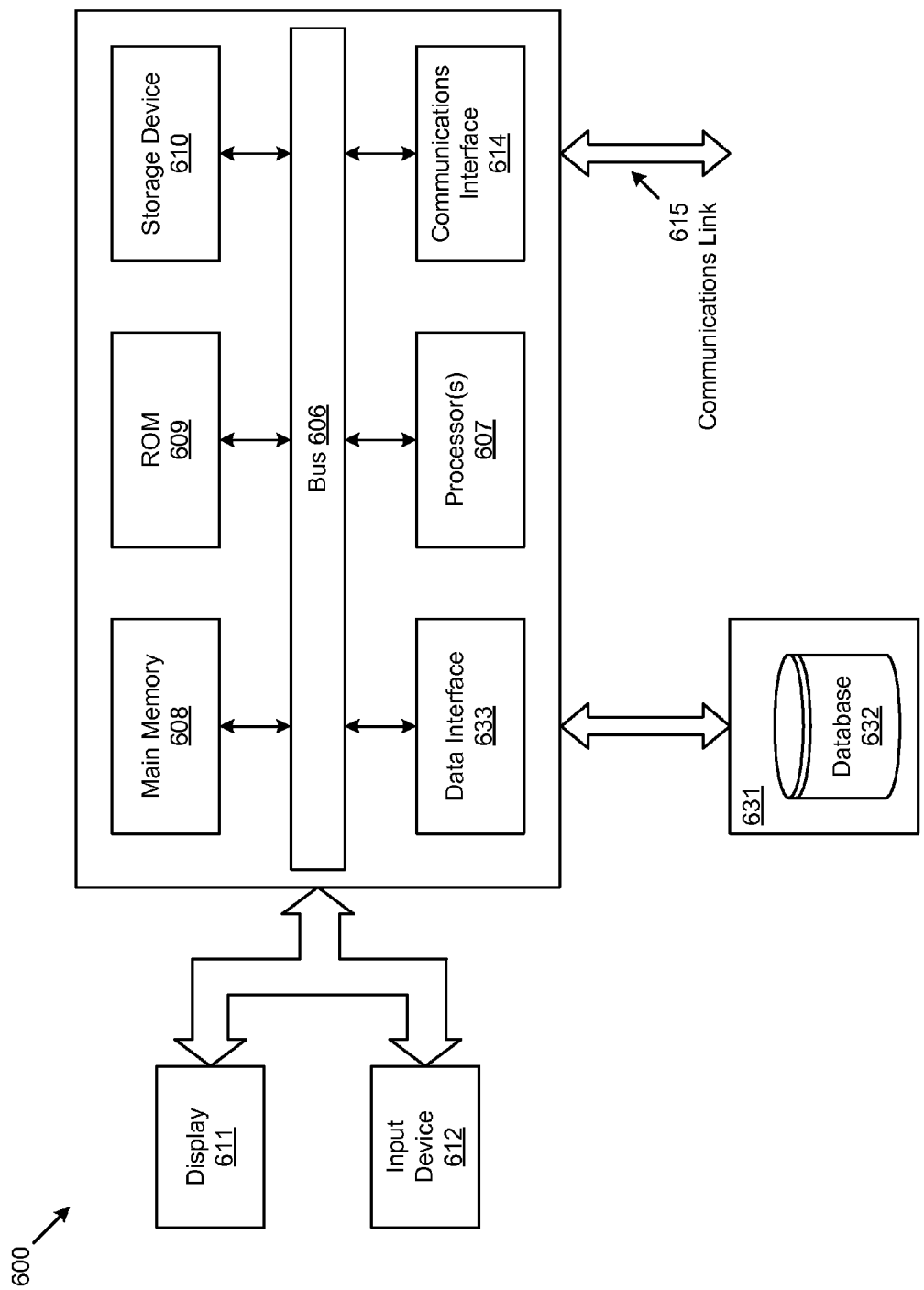
FIG. 6 depicts a block diagram of an instance of a computer system suitable for implementing an embodiment of the present disclosure.

FIG. 6 depicts a block diagram of an instance of a computer system 600 suitable for implementing an embodiment of the present disclosure. Computer system 600 includes a bus 606 or other communication mechanism for communicating information, which interconnects subsystems and devices, such as a processor 607, a system memory 608 (e.g., RAM), a static storage device (e.g., ROM 609), a disk drive 610 (e.g., magnetic or optical), a data interface 633, a communication interface 614 (e.g., modem or Ethernet card), a display 611 (e.g., CRT or LCD), input devices 612 (e.g., keyboard, cursor control), and an external data repository 631.

According to one embodiment of the disclosure, computer system 600 performs specific operations by processor 607 executing one or more sequences of one or more instructions contained in system memory 608. Such instructions may be read into system memory 608 from another computer readable/usable medium, such as a static storage device or a disk drive 610. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 600. According to certain embodiments of the disclosure, two or more computer systems 600 coupled by a communications link 615 (e.g., LAN, PTSN, or wireless network) may perform the sequence of instructions required to practice the disclosure in coordination with one another.

Computer system 600 may transmit and receive messages, data, and instructions, including programs (e.g., application code), through communications link 615 and communication interface 614. Received program code may be executed by processor 607 as it is received, and/or stored in disk drive 610 or other non-volatile storage for later execution. Computer system 600 may communicate through a data interface 633 to a database 632 on an external data repository 631. A module as used herein can be implemented using any mix of any portions of the system memory 608, and any extent of hard-wired circuitry including hard-wired circuitry embodied as a processor 607.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for validating database table partitioning schemes using stratified random sampling, the method comprising:
    receiving, by a computer, an original workload comprising a plurality of queries;
    enumerating stratification buckets based at least in part upon the plurality of queries of the original workload;
    assigning the plurality of queries into one or more of the stratification buckets;
    forming a representative workload for evaluating a plurality of partition schemes, wherein forming the representative workload comprises:
        calculating a standard deviation of an optimizer query cost of the original workload;
        selecting a desired confidence interval and a desired margin of error;
        calculating a number n of queries to be sampled from the original workload to form the representative workload, wherein the number n is calculated based at least in part upon the calculated standard deviation of the original workload, such that the representative workload will have the selected confidence interval and margin of error relative to the original workload;
        sampling the number n of queries drawn from at least some of the stratification buckets to form the representative workload; and
    evaluating, using a computer, each of the plurality of partition schemes using the representative workload to determine a first optimal partition scheme, wherein evaluating the plurality of partition schemes is performed only after the representative workload is formed.

2. The method of claim 1, wherein the stratification criteria is a table grouping.

3. The method of claim 1, further comprising increasing the selected confidence interval to produce a second optimal partition scheme.

4. The method of claim 1, wherein the number n of queries is given by the equation $$n \geq \left(\frac{z\sigma}{M}\right)^2,$$

wherein z corresponds to a z-score based on the selected confidence interval, $\sigma$ corresponds to a standard deviation of a query cost of the original workload, and M corresponds to the selected margin of error.

5. The method of claim 1, wherein sampling a number n comprises sampling a number s(i) samples from the stratification buckets, and where the number s(i) samples is given by:

$$s(i) = \left(\frac{n_i}{N}\right)S,$$

wherein i corresponds to an enumerated stratification bucket, $n_i$ corresponds to a number of queries within the i-th stratification bucket, N corresponds to a total number of queries in the workload, and S corresponds to n.

6. The method of claim 1, wherein the plurality of partition schemes comprises only partition schemes remaining after restricting the number of partition schemes per table.

7. The method of claim 1, wherein the plurality of partition schemes comprises only partition schemes remaining after clustering a set of tables into smaller groups.

8. A computer system for validating database table partitioning schemes using stratified random sampling, comprising:
    a computer processor to execute a set of program code instructions; and
    a memory to hold the program code instructions, in which the program code instructions comprises program code to perform,
        receiving an original workload comprising a plurality of queries;
        enumerating stratification buckets based at least in part upon the plurality of queries of the original workload;
        assigning the plurality of queries into one or more of the stratification buckets;
        forming a representative workload for evaluating a plurality of partition schemes, wherein forming the representative workload comprises:
            calculating a standard deviation of an optimizer query cost of the original workload;
            selecting a desired confidence interval and a desired margin of error;
            calculating a number n of queries to be sampled from the original workload to form the representative workload, wherein the number n is calculated based at least in part upon the calculated standard deviation of the original workload, such that the representative workload will have the selected confidence interval and margin of error relative to the original workload;
            sampling the number n of queries drawn from at least some of the stratification buckets to form the representative workload; and
        evaluating each of the plurality of partition schemes using the representative workload to determine a first optimal partition scheme, wherein evaluating the plurality of partition schemes is performed only after the representative workload is formed.

9. The computer system of claim 8, wherein the stratification criteria is a table grouping.

10. The computer system of claim 8, further comprising increasing the selected confidence interval to produce a second optimal partition scheme.

11. The computer system of claim 8, wherein the number n of queries is given by the equation $$n \geq \left(\frac{z\sigma}{M}\right)^2,$$

wherein z corresponds to a z-score based on the selected confidence interval, σ corresponds to a standard deviation of a query cost of the original workload, and M corresponds to the selected margin of error.

12. The computer system of claim 8, wherein sampling a number n comprises sampling a number s(i) samples from the stratification buckets, and where the number s(i) samples is given by:

$$s(i) = \left(\frac{n_i}{N}\right)S,$$

wherein i corresponds to an enumerated stratification bucket, $n_i$ corresponds to a number of queries within the i-th stratification bucket, N corresponds to a total number of queries in the workload, and S corresponds to n.

13. The computer system of claim 8, wherein the plurality of partition schemes comprises only partition schemes remaining after restricting the number of partition schemes per table.

14. The computer system of claim 8, wherein the plurality of partition schemes comprises only partition schemes remaining after clustering a set of tables into smaller groups.

15. A computer program product embodied in a non-transitory computer readable medium, the computer readable medium having stored thereon a sequence of instructions which, when executed by a processor causes the processor to execute a process to validate database table partitioning schemes using stratified random sampling, the process comprising:
receiving an original workload comprising a plurality of queries;
enumerating stratification buckets based at least in part upon the plurality of queries of the original workload;
assigning the plurality of queries into one or more of the stratification buckets;
forming a representative workload for evaluating a plurality of partition schemes, wherein forming the representative workload comprises:
calculating a standard deviation of an optimizer query cost of the original workload;
selecting a desired confidence interval and a desired margin of error;
calculating a number n of queries to be sampled from the original workload to form the representative workload, wherein the number n is calculated based at least in part upon the calculated standard deviation of the original workload, such that the representative workload will have the selected confidence interval and margin of error relative to the original workload;
sampling the number n of queries drawn from at least some of the stratification buckets to form the representative workload; and
evaluating each of the plurality of partition schemes using the representative workload to determine a first optimal partition scheme, wherein evaluating the plurality of partition schemes is performed only after the representative workload is formed.

16. The computer program product of claim 15, wherein the stratification criteria is a table grouping.

17. The computer program product of claim 15, further comprising increasing the selected confidence interval to produce a second optimal partition scheme.

18. The computer program product of claim 15, wherein the number n of queries is given by the equation $$n \geq \left(\frac{z\sigma}{M}\right)^2,$$

wherein z corresponds to a z-score based on the selected confidence interval, σ corresponds to a standard deviation of a query cost of the original workload, and M corresponds to the selected margin of error.

19. The computer program product of claim 15, wherein sampling a number n comprises sampling a number s(i) samples from the stratification buckets, and where the number s(i) samples is given by:

$$s(i) = \left(\frac{n_i}{N}\right)S,$$

wherein i corresponds to an enumerated stratification bucket, $n_i$ corresponds to a number of queries within the i-th stratification bucket, N corresponds to a total number of queries in the workload, and S corresponds to n.

20. The computer program product of claim 15, wherein the plurality of partition schemes comprises only partition schemes remaining after restricting the number of partition schemes per table, and clustering the tables into smaller groups.

* * * * *

UNITED STATES PATENT AND TRADEMARK OFFICE
CERTIFICATE OF CORRECTION

PATENT NO. : 8,903,807 B2  
APPLICATION NO. : 13/551402  
DATED : December 2, 2014  
INVENTOR(S) : Thiyagarajan et al.

Page 1 of 1

It is certified that error appears in the above-identified patent and that said Letters Patent is hereby corrected as shown below:

Title page, column 1, under Other Publications, line 7, delete "n1/" and insert -- nl/ --, therefor.

Title page, column 2, under Other Publications, line 1, delete "Sciencists" and insert -- Scientists --, therefor.

Signed and Sealed this  
Fourth Day of August, 2015

Michelle K. Lee  
*Director of the United States Patent and Trademark Office*